United States Patent

Ghougasian

[15] 3,650,110
[45] Mar. 21, 1972

[54] REVERSE THRUST DEVICE FOR SUPERSONIC JET ENGINE

[72] Inventor: John N. Ghougasian, 666 West 188th St., New York, N.Y. 10040

[22] Filed: June 2, 1970

[21] Appl. No.: 42,723

Related U.S. Application Data

[62] Division of Ser. No. 790,256, Jan. 10, 1969, Pat. No. 3,552,873.

[52] U.S. Cl. .................... 60/230, 239/265.19, 239/265.35
[51] Int. Cl. .......................................................... F02k 1/20
[58] Field of Search .................... 60/230, 228, 229, 231, 232; 239/265.19, 265.35

[56] References Cited

UNITED STATES PATENTS

| | | | |
|---|---|---|---|
| 3,036,431 | 5/1962 | Vdolek | 60/229 |
| 3,492,821 | 2/1970 | Monaghan | 60/229 |
| 2,857,119 | 10/1958 | Morguloff | 239/265.19 |
| 2,509,238 | 5/1950 | Martin | 60/230 X |
| 2,760,336 | 8/1956 | Reniger | 60/228 X |

Primary Examiner—Clarence R. Gordon
Attorney—Clarence A. O'Brien and Harvey B. Jacobson

[57] ABSTRACT

Combustion products exiting from the rear turbine of a jet engine are conducted through an annular passage surrounding a rear internal body section slidably mounting an exhaust nozzle blocking piston. The exhaust nozzle is releasably locked to the engine housing in a normal mode of operation and released for displacement by the piston when extended to its nozzle blocking position for engine starting purposes and to form a reverse thrust discharge passage by rearward displacement of the nozzle.

5 Claims, 1 Drawing Figure

PATENTED MAR 21 1972
3,650,110
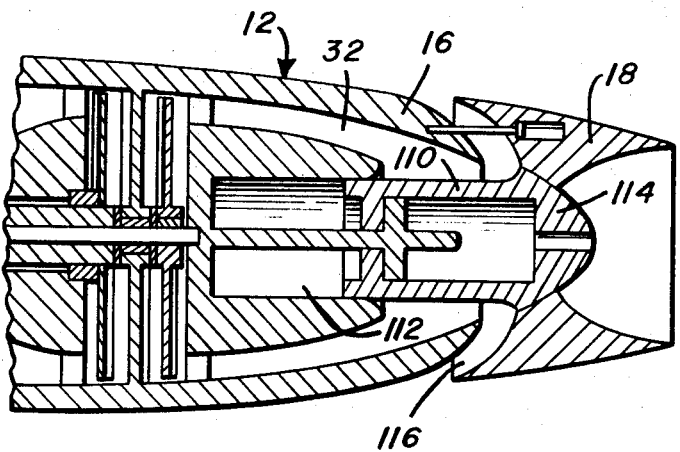
John N. Ghougasian
INVENTOR.
BY *Clarence A. O'Brien*
*and Harvey B. Jacobson*
Attorneys

REVERSE THRUST DEVICE FOR SUPERSONIC JET ENGINE

This invention relates to the development of reverse thrust from a jet engine for braking purposes. This application is a division of my prior copending application Ser. No. 790,256, filed Jan. 10, 1969, now U.S. Pat. No. 3,552,873.

The present invention pertains to the rear end portion of a jet engine having an internal body section about which an annular exhaust passage is formed. An exhaust nozzle is releasably locked to the rear end of the engine housing and is adapted to be engaged by a nozzle blocking piston when extended by fluid means from the internal body section about which the annular exhaust passage is formed. When the piston engages the throat portion of the nozzle, the exhaust from the engine is sealed so that pressure may rapidly build up for engine starting purposes. The nozzle blocking piston is retracted once the internal pressure of the engine is sufficient to sustain operation. The nozzle is released from locked engagement with the engine housing for reverse thrust braking purposes so as to form a passage between the nozzle section and the housing directing exhaust products forwardly when the nozzle is displaced rearwardly by extension of the nozzle blocking piston.

The accompanying drawing forming a part hereof, corresponds to FIG. 14 of the drawings in the copending application, aforementioned, of which the entire specification and drawings are incorporated herein by reference as essential material necessary to support the claims or constitute an adequate disclosure of the invention, with particular reference to FIGS. 1, 13 and 14 and column 5, lines 13–40 in the specification.

What is claimed as new is as follows:

1. In a supersonic jet engine having an intake section, a powered compressor and a combustion section, internal aerodynamic control means comprising variable passage restricting means through which air is conducted from the compressor into the combustion section, said intake section conducting an inflow of air under supersonic conditions producing a predetermined pressure recovery for the air entering the combustion section, and control means operatively connected to said variable passage restricting means for artificially producing said predetermined pressure recovery under subsonic conditions during braking operation, an exhaust passage section conducting exhaust gas from the combustion section, exhaust nozzle means movably mounted on the exhaust passage section for rearwardly discharging the exhaust gas therefrom, braking means responsive to rearward displacement of the nozzle means for discharging the exhaust gas forwardly from the exhaust passage section during said braking operation, a piston valve and means mounting the valve within the exhaust passage section for displacement into engagement with the exhaust nozzle means blocking rearward discharge of the exhaust gas therefrom during said braking operation.

2. The combination of claim 1 including means for locking the nozzle means to the exhaust passage section in a forward thrust producing mode of operation, said piston valve means being extended into engagement with the nozzle means when locked during a starting mode of operation.

3. In a jet engine having an intake section, a powered compressor and a combustion section; an exhaust passage section having a fixed convergent end portion through which exhaust gas from the combustion section is conducted, exhaust nozzle means movably mounted on the exhaust passage section for rearwardly discharging the exhaust gas therefrom, braking means responsive to displacement of the nozzle means rearwardly of the convergent end portion for discharging the exhaust gas forwardly therefrom, and piston valve means mounted in the exhaust passage section and rearwardly extensible therefrom into engagement with the exhaust nozzle means for said rearward displacement thereof and to block rearward discharge of the exhaust gas.

4. The combination of claim 3 including means for locking the nozzle means to the exhaust passage section in a forward thrust producing mode of operation, said piston valve means being extended into engagement with the nozzle means when locked during a starting mode of operation.

5. In a jet propulsion power unit having a convergent exhaust section, an axially adjustable discharge nozzle having convergent and divergent passage portions and a forward face engageable with the exhaust section, means for locking the nozzle in a first position with the forward face engaging the exhaust section wherein the convergent passage portion conducts exhaust discharge from the exhaust section rearwardly through the divergent passage portion, and control means extensible from the exhaust section into engagement with the nozzle for blocking flow through the passage portions thereof and displacing the same to a second position with the forward face spaced from the exhaust section forming a reverse flow passage, said control means comprising a piston valve received within the convergent passage portion of the nozzle and projecting into the divergent passage portion to block flow rearwardly through the nozzle.

* * * * *